United States Patent [19]

Kiefer et al.

[11] Patent Number: 4,588,540

[45] Date of Patent: May 13, 1986

[54] METHOD OF MANUFACTURING POROUS SINTERED INORGANIC BODIES WITH LARGE OPEN PORE VOLUME

[75] Inventors: Werner Kiefer, Mainz-Finthen; Maria Sura, Ingelheim, both of Fed. Rep. of Germany

[73] Assignee: Schott Glaswerke, Mainz, Fed. Rep. of Germany

[21] Appl. No.: 579,539

[22] Filed: Feb. 13, 1984

[30] Foreign Application Priority Data

Feb. 19, 1983 [DE] Fed. Rep. of Germany ....... 3305854

[51] Int. Cl.$^4$ .................. B29C 67/04; C04B 38/04; C03B 19/06
[52] U.S. Cl. ......................... 264/43; 65/18.1; 65/22; 65/31; 264/49; 264/125
[58] Field of Search ............... 264/42, 43, 49, 125; 65/18.1, 22, 31

[56] References Cited

U.S. PATENT DOCUMENTS

| | | | |
|---|---|---|---|
| 3,184,371 | 5/1965 | Seidle | 264/42 |
| 3,321,414 | 5/1967 | Villi | 264/42 |
| 3,560,231 | 2/1971 | Moore | 264/42 |
| 3,700,470 | 10/1972 | Barton | 264/42 |
| 3,859,405 | 1/1975 | Horton | 264/49 |
| 3,949,029 | 4/1976 | Ulisch | 264/42 |
| 3,949,030 | 4/1976 | Murata | 264/42 |
| 4,296,056 | 10/1981 | Bumbalek | 264/49 |
| 4,330,589 | 5/1982 | Saito | 264/42 |
| 4,425,291 | 1/1984 | Beer | 264/42 |

*Primary Examiner*—Philip Anderson
*Attorney, Agent, or Firm*—Quaintance, Murphy & Presta

[57] ABSTRACT

A process for the manufacture of porous sintered bodies with large open pore volume and defined pore diameter. A sinterable material in the form of finely ground powder is mixed with a leachable substance. The leachable substance is in the form of powder of a defined particle size. The mixture of sinterable material and leachable substance is heated to the sintering temperature and maintained there until the sinterable mass is sintered. The mass is then cooled and the leachable substance leached from the sintered mass.

23 Claims, No Drawings

METHOD OF MANUFACTURING POROUS SINTERED INORGANIC BODIES WITH LARGE OPEN PORE VOLUME

DESCRIPTION

This invention relates to a process for the manufacture of porous sintered bodies with large open pore volume and defined pore diameter. The process is characterized in that a material to be sintered in the form of finely ground powder is mixed with a leachable substance which exhibits a higher melting point than the sintering temperature of the material to be sintered and which is in the form of powder of a defined particle size. The mixture of material to be sintered and leachable substance is heated up to the sintering temperature and held there sufficiently long until the material be sintered is sintered. The sintered product is cooled and the leachable substance leached out at a temperature below the sintering temperature. It is to be understood that as used herein the term "material to be sintered" includes glass, and/or glass ceramic, and/or ceramic materials.

A known process for the manufacture of porous sintered glass bodies with open pore volume comprises that wherein ground glass of a specific particle size is heated in a form to a temperature such that the glass particles soften and sintering among the particles occurs at their points of contact. Such sintered glass bodies are used mainly as filters. By means of selection of the particle size of the glass, filters with defined passages can be manufactured such as for example filters with passages of 10 to 16 um as well as filters with passages of 160 to 250 um. The density and therefore the open pore volume of these sintered glass bodies is generally determined by the gross weight of the glass powder. An open pore volume of over 35 percent cannot be achieved with this sintering process.

For the manufacture of open pore sintered ceramic bodies, a large number of processes are known based upon the principal that the ceramic powder to be sintered is mixed with organic substances. The ceramic powder to be sintered comprises generally ground crystalline powder with a small amount of glass powder. During the heating process the organic substances are burned away producing supplemental spaces. The glass powder which is added contributes to the binding strength.

If in this process no crystalline, ceramic material is used but rather if only glass powder is used, then the article one obtains either has limited strength or limited pore volume. Since generally the organic substances are burned away before the sintering temperature is reached, the sintering must be achieved at relatively low temperatures in the presence of glassy materials, for at higher sintering temperatures i.e., after the filler material is burned away, the glass shrinks together. The glass powder used at these low sintering temperatures has large intersticial spaces but however has insufficient strength. This process is poorly suited for the manufacture of porous glass bodies with large open pore volume.

Further processes are known relating to the manufacture of highly porous glass bodies. In the case of these processes a foaming agent such as for example SiC is added to the glass powder or to the melted glass. At high temperatures the foaming agent causes the viscous glass to foam. In this process the temperature must be controlled so that as soon as the glass foams, the gases contained within the glass do not escape, for otherwise the foamed glass will collapse. Framed glasses manufactured in this manner exhibit a high pore voume but possess, however, practically no open pores and are, therefore, employed for example as thermal insulators.

In U.S. Pat. No. 1,515,653 a process for the manufacture of glass foam from glass fibers is described. In this process, the glass fibers are sintered at their points of contact. In order to avoid loss of the open structure of the glass wool, the spaces between the glass fibers are filled with about 20 times the amount of inert material which melts more easily than the glass and at lower temperatures can be removed. Salts are proposed as the inert material. This process is, however, not suitable for the manufacture of open pored bodies with defined pore sizes.

It is an object of the present invention to provide a process for the manufacture of open pore, sintered, formed bodies that possess a large open pore volume and simultaneously have a defined pore size as well as well defined pore diameter which cannot be achieved by prior processes. This object is achieved by means of the claimed process.

The process of the present invention is based on the principal that the resultant pore volume and the resultant pore size of the sintered bodies can be determined by the ratio of the material to be sintered to the leachable substance and by means of the particle size of the leachable substance. Since the leachable substance possess a melting point which lies higher than the sintering temperature of the material to be sintered the occupied volume changes neither during the heating up process nor during the sintering process.

Because the occupied volume supplied by the leachable substance does not change during the sintering procedure, the volume produced by the leachable substance represents the minimum pore volume. This mimimum pore volume is independent of the sintering time and the sintering temperature as long as the sintering temperature remains under the melting temperature of the leachable substance. The degree of contraction of the formed body during the sintering procedure is dependant exclusively on the shrinkage of the material to be sintered. The smaller is the ratio of material to be sintered to leachable substance the smaller will be the possible shrinkage. Since an intensive sintering raises the strength of the sintered body, a complete sintering of the mass to be sintered is desired by extension of the sintering time and/or by raising of the sintering temperature.

All materials are suitable to be employed as the material to be sintered which materials sinter at high temperatures such as for example materials of glass and/or glass ceramic and/or ceramic.

For glasses as well as for mixtures containing some glass, sintering temperatures of 50° to 100° K. above the glass transition temperature of the glass is sufficient when using longer sintering times. Better still are temperatures in the vicinity of the softening temperature ($E_w$) of the glass since at this temperature sintering times can be appreciable shortened. However, temperatures between $E_w$ and the working temperature ($V_A$) are also possible in the present invention. The large variation in the sintering temperature can be of significance for example for easily devitrifying glasses.

At the same weight, the required sintering time is dependant on the sintering temperature and the density of the specimen. Lower sintering temperatures require longer sintering times. Compared to the prior art processes, in the case of glasses, the sintering time is not so greatly limited but rather is based on economic grounds or whether the glasses employed are inclined toward crystallization or separation. If crystallization or separation is not desired, which must not necessarily be the case, then another sintering temperature and/or sintering time is selected.

An even formed, even pore distribution is achieved by means of a thorough mixture of the leachable substance and the material to be sintered. The mixing can be achieved in a dry condition. Drying is unnecessary and the mixture can be placed directly in the oven kept at sintering temperatures. The pore volume can be determined by the selection of ratio of material to be sintered to leachable substance. Small amounts of leachable substance, as for example amounts equal to or less than 20 volume percent, give no appreciable increase of pore volume compared to normal sintered bodies which are manufactured only by means of sintering of the mass to be sintered without supplemental materials. At less than 10 volume percent of leachable substance, it cannot be certain that the leachable substance can be completely leached from the sintered body.

Open pore volumes of 40 to 85 volume percent can still be achieved with salt particle sizes equal to or less than 200 um in diameter and a proportion of salt of equal to or less than 65 volume percent. For open pore volumes of greater than 85 volume percent the salt must have a particle size of over 200 um up to a few millimeters in diameter.

With increasing particle size of the leachable substance, large voids result after the leaching process. These large voids are connected to one another by narrow channels.

A proportion of leachable substance of 30 to 70 volume percent is especially advantageous.

It is especially advantageous if the particle size of the material to be sintered is smaller than the particle size of the leachable substance or has the same size as the particle size of the leachable substance. For sintered bodies with differing pore sizes a material to be sintered can be employed which has a single particle size. In this manner a sieving out of the material to be sintered into different fractions is superfluous. The particle size of the material to be sintered should be less than 50 um and preferably less than 20 um.

According to the claimed invention, the pore size of body can be determined by the particle size of the leachable substance and/or the ratio of material to be sintered to leachable substance.

Several procedures are available for the measurement of pore size. For determination of the pore size of filters having pore diameters of 1 to 500 um one generally employes the bubble point method of Bechtold (Frank W.: GIT 11 (1967), Volume 7, Pages 663–688).

It has been demonstrated that the particle size of the leachable substance must be the same as or larger than the desired pore diameter measured by the above described method. The smaller is the proportion of leachable substance, the smaller will be the measured pore diameter. This is because at a higher proportions of material to be sintered, the particles of the leachable substance are substantially surrounded by the material to be sintered. According to the claimed process, pore sizes between 1 and 500 $\mu$m and preferably between 10 and 200 um are desired. Therefore, particle sizes of the leachable substance from about one $\mu$m to a few millimeters and preferably from 1 to 500 $\mu$m are necessary.

Inorganic salts are the preferred leachable substance whose melting temperature lies higher than the sintering temperature of the material to be sintered and which can be leached from the mixed body at temperatures less than the sintering temperature.

Next to a high melting point, the leachable substance must also exhibit good solubility. The solubility is, however, not limited to solubility in aqueous solutions such as water, acids or bases. Melted salt or a mixture of melted salts can also serve as the leaching agent.

Leachable substances which have the above described properties include among others halogens, sulfates, sulfides, carbonates, phosphates, chromates, tungstates, aluminates, silicates and zirconates. Especially desirable and inexpensive leachable substances for use with glasses includes the alkali chlorides and sulfates and the alkaline earth chlorides, and the sulfates such as for example $NaCl$, $Na_2SO_4$ and $K_2SO_4$.

Water is the most desired leaching agent because of cost. In order not to burden the environment with waste products, the leaching can be achieved by extraction and reflux. This process has the advantage that the extraction can be achieved with hot, fresh leaching agent. The salt precipitates from the solution when the saturation point is exceeded. The salt can be removed by filtration. By means of crystallization or other processes, the salt can be recovered having the desired particle size.

The leaching of the leachable substance can be accelerated by means of ultra sound.

According to the claimed process ion exchange between the material to be sintered and the leachable substance must be considered since at the sintering temperature several ions in the material to be sintered can already possess an elevated speed of diffusion. For example, a sodium-potassium exchange occurs between a sodium containing glass and potassium sulfate at the sintering temperature. By means of selection of the material to be sintered and/or the leachable substance, the properties of the material to be sintered can be improved by means of ion exchange during the sintering procedure. By means of ion exchange, during the sintering procedure the phase stability of the glass can be improved, the tendency for surface crystallization of glass can be lower or a glass in the crystal phase can be achieved.

The ion exchange can also be suppressed if in the material to be sintered and in the leachable substance the same easily diffusable ions or no easily diffusable ions are present. If, for example, a sodium containing glass is sintered with a sodium salt or an alkali free glass is sintered with an alkaline earth salt then the properties of the glass are altered only slightly or not at all.

The mixture of material to be sintered and leachable substance can be rapidly or slowly raised to the sintering temperature. The sintering can be advantageously practiced under pressure. Since in the process only a slight shrinkage of the sintered body takes place, a mixture of glassy materials to be sintered and leachable substance can be melted directly with the solid glass body.

Pursuant to the claimed invention it is also possible to add to the mixture of material to be sintered and leachable substance, a plasticizer as is done in the ceramic industry. This mixture must be well mixed and kneaded before molding. After molding, the plasticized mass must be dried. The forming can be achieved by standard industrial processes such as for example pressing, extrusion or rolling. After forming the plasticized mass must be dried. Existing organic components are burned by means of slowly heating up the mass or by holding the mass at a temperature under 500° C., for otherwise it leads to a baking of the sintered body.

Especially in filter technology it is desired to maintain a high rate of flow through the filter in addition to a high degree of separation. According to the present invention, this is achieved by means of the large open pore volume. The rate of flow through the filter can be still further increased by means of the manufacture of a layer filter. The layer filter can comprise for example a thicker carrying layer and a thin separation layer. The carrying layer comprises a sintered body having large open pore volume and relatively wide pore diameter; that is to say, the ratio of material to be sintered to leachable substance is small and the particle size of the leachable substance is selected to be relatively large. In the case of the separation layer the ratios are reversed. In order to achieve a good separation, the pore diameter must be as small as possible; in order to achieve this, the ratio of material to be sintered to leachable substance must be selected to be large and/or the particles of the leachable substance must be selected to be small.

It has been demonstrated that the process of the present invention is especially well suited for the manufacture of layer filters. In the first place, the shrinkage which normally occurs in the prior art processes is very severely decreased by means of the leachable substance. In the second place the differing shrinkage, which normally occurs during sintering of bodies of differing particle sizes, is avoided by the application of pressure. The pressure makes possible a certain flowing without appreciably changing the pore volume or the pore diameter.

The process of the present invention is, however, not limited to the manufacture of layer filters. Formed bodies can be manufactured from a mixture of material to be sintered, leachable substance and plasicizer. After the drying procedure, a layer filter can be produced by use of a second mixture comprising material to be sintered, leachable substance, and plasticizer, wherein however the ratio of material to be sintered to leachable substance and or the particle size of the leachable substance is different. The second mixture can, for example, be applied by dipping, spraying, or brushing. Thin foils are also suitable for the application of very thin layers. These foils can be manufactured by the sieve pressure process and applied in the same manner as decals.

The process of the present invention possesses a number of appreciable advantages compared to the previously known processes. Compared to previously known processes for the manufacture of sintered bodies from powdered sintered material, the present process has, among others, the following advantages. By means of the introduction of the leachable substance, a large open pore volume can be achieved at the same pore diameter, this yields an appreciably higher rate of flow through the body at the same degree of separation as well as a higher degree of separation at the same rate of flow. Furthermore, in practice, the process of the present invention is appreciably simpler to control since small variations in the sintering time and the sintering temperature have no influence on the quality of the end product.

Compared to processes employing organic filler materials, the process of the present invention has the advantage that there is no burning out of the organic material such as, for example, polystyrene which is highly polluting. The process of heating up can be appreciably shortened in the present invention. The organic filler materials furthermore have the disadvantage that they are unsuitable for sinterd glass bodies since the glass shrinks together during sintering after the burning away of the organic materials.

The advantages of the process of the present invention lie in the manufacture of a large open pore volume, its exact arrangement of pore diameter, its simple and flexible practice. By means of the process of the present invention, the following properties of sintered bodies are appreciably improved:
high through put speed
high selectivity,
low density,
high mechanical strength,
good mechanical workability,
high absorbability, and
high liquid absorptive capacity.

Highly porous sintered bodies manufactured pursuant to the present invention are suitable, for example, for filtering of liquids and gases, for the absorption of liquids, for the absorption of plastics, for plastic-glass compounds, for the separation of emulsions (coagulation) for the transfer of liquids, vapors, and gases from a cold into a warm zone and as carriers for catalysts.

The process of the present invention is explained more fully below by reference to the following examples.

EXAMPLE 1

This example shows the influence of the ratio of materials to be sintered to leachable substance and the particle size of the material to be sintered and the leachable substance on the density, the pore volume, the water absorbability and the mechanical strength.

The known borosilicate glass called "DURAN" of the company SCHOTT GLASWERKE of Mainz, Germany, known as type number 8330 is employed in this example as the material to be sintered. The glass transition temperature (Tg) of this glass is 530° C., the softening temperature (Ew)(visocity n of the glass $10^{7.6}$ dPa-s) is 815° C. and the working temperature ($V_A$) ($n=10^4$ dPas) is 1270° C. The density of the glass is 2.23 g/cm$^3$.

Potassium sulfate ($K_2SO_4$) is added as the leachable substance. The $K_2SO_4$ has a melting point of 1069° C. and a soluability in water of 10% at 20° C. The average particle size of the glass powder and the salt is given in Table 1 below.

TABLE 1

| Average Particle Size of Glass and Salt | |
|---|---|
| Designation | Particle Size (um) |
| Glass: | |
| $D_0$ | 400–650 |
| $D_1$ | 200–400 |
| $D_2$ | 100–200 |
| $D_3$ | 45–100 |
| $D_4$ | 45 |
| Salt: $K_1$ | 100–200 |
| $K_2$ | 60–100 |
| $K_3$ | 60 |

The particles $D_0$ through $D_4$ are also employed for the manufacture of filter plates. The sintering temperature for the manufacture of filter plates lies between 750° and 850° C. according to the particle size of the glass powder. The sintering temperature of the following experiments is 850° C. and the sintering time is 20 minutes. The test samples to be sintered are placed directly into the hot oven. The sintering time is measured after the desired sintering temperature is reached. After sintering the test samples are cooled in air.

In the first column of Table 2 is shown the composition in volume percent as well as the particle size of the glass and the salt. "50 $D_4$ 50 $K_1$" means 50 volume percent glass powder of particle size $D_4$ mixed with 50 volume percent salt of particle size $K_1$. It has been shown for example that the density of 0.35 g/cm$^3$ is achieved with fine glass powder ($D_4$) and large salt $K_1$. With increasing glass particle size or with decreasing salt particle size, the cohesion is reduced.

At a salt content of 20 percent, sintering causes an increased shrinkage. This shrinkage is caused because the 20 volume percent of salt is insufficient to fill all voids. The glass melts together at the relatively high sintering temperature. The water absorbability confirms the porosity calculated based on the density. From the above it is proper to assume that all pores are open. This assumption is confirmed by electron beam microscopy. The mechanical strength is proportional to the density. It is furthermore independent of the particle size of the glass as well as of the salt.

During the sintering process an ion exchange takes place between the sodium in the DURAN-glass and the potassium ions from the pore building potassium sulfate. This improves the phase stability of the glass.

times the value in classical sintered filters compared to the degree of separation points as measured

TABLE 3

| Composition | | Density | Pore Diameter | Quantity of Water Flowing Through | Water Absorption |
|---|---|---|---|---|---|
| % D | % K | [g/cm$^3$] | [um]* | [ml · sec$^{-1}$] | [g/cm$^3$] |
| 100 $D_1$ | 0 | 1.57 | 120 | 159 | 0.25 |
| 30 $D_4$ | 70 $K_1$ | 0.42 | 120 | 588 | 0.76 |
| 100 $D_2$ | 0 | 1.45 | 70 | 152 | 0.33 |
| 30 $D_4$ | 70 $K_2$ | 0.43 | 75 | 313 | 0.78 |
| 100 $D_2$ | 0 | 1.43 | 55 | 48 | 0.29 |
| 40 $D_4$ | 60 $K_2$ | 0.65 | 55 | 138 | 0.55 |
| 40 $D_4$ | 60 $K_3$ | 0.72 | 45 | 128 | 0.58 |

*Measured by the bubble point method of Bechthold (Reference: Frank W. GIT 11, 1967, Volume 7, Pages 683–688)

EXAMPLE 3

The claimed process is independent of the glass composition. In order to show this, six characteristic technical glasses are selected and are shown in Table 4. In the first column, the type and number of the glass is given. With the single exception of the window glass, all these glasses are offered for sale by the firm of SCHOTT GLASWERKE of Mainz, Germany. Glass Number 4210 is a high alkali containing glass (25 wt. % alkali) having a high thermal coefficient of expansion. The window glass has a known composition and known properties (sodium-lime-silicate-glass). The same applies for glass number 8330 which is known in the trade as the laboratory glass "DURAN"; which borosilicate

TABLE 2

Composition and Properties of Sintered Glass Bodies

| Composition | | Density | Calculated Porosity | Pore Size | Shrinkage | Water Absorption | | Strength |
|---|---|---|---|---|---|---|---|---|
| % D | % K | [g/cm$^3$] | | [um] | [%] | g/cm$^3$ | g/g | [N/mm$^2$] |
| 50 $D_4$ | 50 $K_1$ | 0.57 | 74.4 | | | | | |
| 50 $D_4$ | 50 $K_1$ | 0.55 | 75.3 | | | | | 4.05 |
| 40 $D_4$ | 60 $K_1$ | 0.40 | 82.1 | 70–100 | 0 | 0.78 | 1.90 | |
| 40 $D_4$ | 60 $K_2$ | 0.34 | 84.8 | 40–70 | | 0.82 | 2.42 | |
| 35 $D_4$ | 65 $K_1$ | 0.35 | 84.4 | 70–100 | | 0.82 | 2.38 | 0.49 |
| 35 $D_4$ | 65 $K_2$ | | | | | | | |
| 80 $D_4$ | 20 $K_1$ | 1.21 | 45.7 | | 44 | 0.28 | 0.23 | |
| 80 $D_4$ | 20 $K_2$ | 1.08 | 51.5 | | 41 | 0.36 | 0.33 | 11.03 |
| 80 $D_4$ | 20 $K_3$ | 1.02 | 54.3 | | 37.5 | 0.38 | 0.37 | |
| 80 $D_3$ | 20 $K_1$ | 1.35 | 39.7 | | 24.9 | 0.28 | 0.21 | |
| 80 $D_3$ | 20 $K_2$ | 1.24 | 44.6 | | 20.1 | 0.37 | 0.30 | 9.31 |
| 80 $D_3$ | 20 $K_3$ | 1.29 | 42.1 | | 29.8 | 0.30 | 0.23 | 12.75 |
| 80 $D_2$ | 20 $K_1$ | 1.10 | 50.5 | | 4.8 | 0.32 | 0.29 | |
| 80 $D_2$ | 20 $K_2$ | 1.13 | 49.2 | | 6.2 | 0.48 | 0.42 | |
| 60 $D_4$ | 40 $K_1$ | 0.69 | 69.0 | | 15.5 | 0.63 | 0.91 | |
| 60 $D_4$ | 40 $K_2$ | 0.84 | 62.3 | | 17.5 | 0.60 | 0.71 | |
| 60 $D_4$ | 40 $K_3$ | 0.74 | 66.6 | | 24.1 | 0.59 | 0.80 | |
| 60 $D_3$ | 40 $K_1$ | 0.73 | 67.2 | | 0 | 0.59 | 0.81 | |
| 60 $D_3$ | 40 $K_2$ | 0.76 | 66.1 | | 9.6 | 0.56 | 0.74 | |
| 60 $D_3$ | 40 $K_3$ | 0.77 | 65.4 | | 9.4 | 0.64 | 0.83 | |
| 60 $D_3$ | 40 $K_1$ | 0.58 | 74.1 | | 0 | 0.57 | 0.98 | |
| 60 $D_2$ | 40 $K_2$ | | | | | | | |
| 60 $D_2$ | 40 $K_3$ | | | | | | | |

EXAMPLE 2

In the case of manufacture of glass filters according to the herein described method attainable higher pore volumes with unchanged pore sizes, raises the through put rate at the same degree of separation in comparison to prior sintered filters. As shown by the enumerated values in Table 3 for quantity of water flowing through, these values correspond to approximately two to four glass is the mass produced glass having the lowest thermal coefficient. Glass Number 8337 is a high boric acid glass ( 25 wt. % $B_2O_3$); Glass Number 8409 is a high alumina containing glass (20 wt. % $Al_2O_3$); Glass Number 8095 is a high lead containing glass (30 wt. % PbO).

As a salt $K_2SO_4$ having a particle size of 100 to 200 um is used. Each mixture contains 50 volume % glass powder and 50 volume % salt. The sintering time is held constant at 20 minutes for all glasses and the sintering temperature is adjusted for the type of glass. The open pore volume is calculated from the density of the glasses and the density of the sintered body. The fact that the water absorbability does not corresponded exactly to the open pore volume is caused by the size of the test samples.

TABLE 4

Sintered Glass Bodies of Various Glasses

| Glass | a $10^{-6}[K^{-1}]$ | Viscosity [dPas] Tg [°C.] | $10^{7.6}$ | $10^4$ | Glass Density [g/cm$^3$] | Composition | Sintering Temperature [°C.] | Density of Sintered Glass [g/cm$^3$] | Water Absorption [ml/cm$^3$] | Pore Volume [VOL. %] |
|---|---|---|---|---|---|---|---|---|---|---|
| 4210 | 12.4 | 450 | 614 | 880 | 2.68 | 50:50 | 650 | 0.74 | 0.65 | 72.4 |
| Window glass | 9.0 | 550 | 730 | 1035 | 2.5 | 50:50 | 765 | 0.66 | 0.68 | 73.6 |
| 8330 | 3.25 | 530 | 815 | 1270 | 2.23 | 50:50 | 850 | 0.41 | 0.67 | 78.9 |
| 8337 | 4.1 | 438 | 695 | 1115 | 2.17 | 50:50 | 740 | 0.60 | 0.64 | 72.4 |
| 8409 | 4.1 | 730 | 950 | 1235 | 2.56 | 50:50 | 1000 | 0.82 | 0.54 | 68.0 |
| 8095 | 9.1 | 430 | 630 | 982 | 3.02 | 50:50 | 680 | 0.82 | 0.70 | 72.8 |

EXAMPLE 4

According to the claimed process, the melting temperature of the leachable substance should be greater than the temperature which is necessary for sintering of the sinterable substance. Furthermore, the leachable substance must be removable from the resultant bonded body after the sintering process without destruction of the sintered matrix.

In order to test the results of different salts, mixtures of 50 volume % Glass Number 8330 as well as window glass having a particle size of $D_4$ and 50 volume % of the salt to be tested are manufactured; are tempered for 20 minutes at 850° C. or at 765° C. resp. and after cooling of the test samples, the salt is leached out with hot water. Table 5 shows the results of experiments.

TABLE 5

| Type of Glass | Salt | Sintering temp [°C.] | Density of Sintered Glass [g/cm$^3$] | Water Absorption [ml/cm$^3$] | Pore Volume [Vol. %] |
|---|---|---|---|---|---|
| Window glass | Li$_2$SO$_4$ | 765 | 0.73 | 0.52 | 70.8 |
| 8330 | Na$_2$SO$_4$ | 850 | 0.44 | 0.66 | 80.3 |
| 8330 | K$_2$SO$_4$ | 850 | 0.47 | 0.67 | 78.9 |
| 8330 | MgSO$_4$ | 850 | 0.64 | 0.55 | 70.9 |
| Window glass | NaCl | 765 | 0.64 | 0.61 | 74.4 |

In the second experiment in Table 5 employing Glass Number 8330 and Na$_2$SO$_4$ and in the last experiment in Table 5 employing window glass and NaCl, no ion exchange is observed contrary to the remaining experiments in Table 5.

EXAMPLE 5

Manufacture of an open pore sintered body from glass ceramic

Fifty volume percent of "ZERODUR" powder is sintered with fifty volume percent potassium sulfate at 1000° C. for ten minutes. Following the ion exchange which takes place, a porous matrix results after leaching out of the leachable potassium sulfate and coating of leucite (KAlSi$_2$O$_6$). Sixty weight percent CERADUR powder with fifteen volume percent of Glass Number 8462 of the firm SCHOTT GLASWERKE is sintered with forty percent melted magnesium sulfate having a particle size of 200 to 500 um and five percent lithium sulfate at 1000° C. after leaching out of the salt mixture, the matrix comprises corderite. The density is 0.97 g/cm$^3$. The water absorbability is 0.47 ml/cm$^3$.

EXAMPLE 6

Plasticization of the Mixture of Sinterable Material and Leachable Substance

A mixture comprising sixty weight percent DURAN powder whose particle size is equal to or less than 40 um and potassium sulfate whose particle size is equal to or less than 120 um is plasticized according to one of the known methods in the ceramic industry wherein the proportion of plasticizer is about 25 weight percent. The forming can then be achieved by means of extrusion. The properties are practically those given in Table 2.

EXAMPLE 7

Manufacture of a Layer Filter

A mixture of 40 weight percent DURAN powder having a particle size of less than 20 um and 60 weight percent potassium sulfate of particle size equal to or less than 40 um is pressed into a disc having a thickness of about 2 mm. Thereupon a second mixture of 40 weight percent DURAN powder of the same particle size and 60 weight percent of large particle size (200-400 um) potassium sulfate is pressed having a thickness of about 10 mm. This two layered formed body is sintered in a conventional manner while holding the two layers together in order to avoid separation of the layers. After leaching out of the potassium salt, the resultant body exhibits the filter properties of a thin layered fine filter but has the strength corresponding to the thick second layer having large pores.

What is claimed is:

1. A process for the manufacture of porous sintered bodies with large open pore volume and defined pore diamenter characterized in that a sinterable material in the form of finely ground powder is mixed with a leachable substance which exhibits a melting point higher than the sintering temperature of the sinterable mass, and wherein the leachable substance is in the form of powder of a defined particle size; the mixture of sinterable material and leachable substance is heated to the sintering temperature and maintained there until the sinterable mass is sintered; thereafter the sintered products are cooled and the leachable substance is leached from the sintered product at a temperature under the sintering temperature.

2. A process of claim 1 characterized in that the sinterable material is a glass and/or a glass ceramic and/or a ceramic material.

3. A process of claim 1 characterized in that the open pore volume is determined by the ratio of the amount of powder of the sinterable material to the amount of powder of the leachable substance, wherein the open pore volume is the same as or is greater than the amount of powder of the leachable substance in volume percent.

4. A process of claim 3 characterized in that the ratio of amount of powder of the sinterable material to the amount of powder of the leachable substance is between 10 to 1 and 1 to 10.

5. A process of claim 1 characterized in that the pore size is dependent on the ratio of powder volume of sinterable material to powder volume of leachable substance and/or the particle size of the leachable substance, wherein the particle size of the leachable substance is the same size or is greater than the desired pore size.

6. A process of claim 1 characterized in that the sinterable material exhibits a smaller particle size or the same particle size as the leachable substance.

7. A process of claim 6 characterized in that the particle size of the sinterable material is less than 50 um and preferably less than 20 um.

8. A process of claim 1 characterized in that the particle size of the leachable substance lies between one um and a few um depending on the desired pore size in its main volume.

9. A process of claim 1 characterized in that as the leachable substance inorganic salts, preferably alkali or alkaline earth chlorides, sulfates, or carbonates are used.

10. A process of claim 1 characterized in that as the leachable substance a substance is used which is soluble in aqueous solutions, acids, bases or melted salts.

11. A process of claim 1 characterized in that the composition of the sinterable material and the composition of the leachable substance is selected such that during the sintering process an intensive ion exchange takes place between the sinterable material and the leachable substance.

12. A process of claim 1 characterized in that the composition of the sinterable material and the composition of the leachable substance is selected such that during the sintering process no ion exchange or only a small ion exchange takes place between the sinterable mass and the leachable substance.

13. A process of claim 1 characterized in that a plasticizer is added to the mixture of sinterable material and leachable substance, the entire mixture is kneaded in a kneader, the resultant plastic mass is placed in a form and finally dried before the sintering occurs.

14. A process of claim 13 characterized in that the forming process is performed by means of compressing, rolling or extrusion.

15. A process of claim 1 characterized in that two or more mixtures with different ratios of sinterable material to leachable substance and/or different particle sizes of the leachable substance are sintered with each other so that layer bodies result wherein the layers are distinguished by different pore volumes and/or pore sizes.

16. A process of claim 13 characterized in that after the forming and after the drying but before the sintering, the formed body is covered with a mass comprising the sinterable material, leachable substance, and plasticizer wherein the mass of the layer is distinguished from the formed body by the ratio between the sinterable material and leachable substance and/or by the particle size of the leachable substance.

17. A process of claim 16 characterized in that after the drying of the formed body and prior to the sintering the formed body is coated by means of immersion, spraying, painting, or by applying a performed foil onto the formed body.

18. A process of claim 1 characterized in that the sintering occurs under pressure.

19. A process for the manufacture of a porous sintered body having a large open pore volume; comprising the steps of:
   I. mixing glass particles with salt particles in a volumetric ratio of 10:1 to 1:10;
   wherein the glass particles have a diameter of 1 to 50 um; and
   wherein the salt particles have a diameter of 1 to 500 um to produce a mixture; and then
   II. heating the mixture to a temperature that is from 50° to 100° K. above the glass transition temperature of the glass until the glass particles are sintered by melting one to the other at their points of contact to form a hot, sintered body; and then
   III. cooling the hot, sintered body to form a cooled sintered body; and then
   IV. leaching the salt from the cooled sintered body to produce a porous sintered body having a large open pore volume;
   wherein the melting point of the salt is higher than the temperature of heating in Step II.

20. A process for the manufacture of a porous sintered body having a large open pore volume; comprising the steps of:
   I. mixing glass particles with salt particles in a volumetric ratio of 3:7 to 7:3;
   wherein the glass particles have a diameter of 1 to 20 $\mu$m; and
   wherein the salt particles have a diameter of 1 to 500 $\mu$m;
   wherein the salt particles consist essentially of $K_2SO_4$ to produce a mixture; and then
   II. heating the mixture to a temperature of 580° to 1000° C. until the glass particles are sintered by melting one to the other at their points of contact to form a hot, sintered body; and then
   III. cooling the hot, sintered body to form a cooled sintered body; and then
   IV. leaching the salt from the cooled, sintered body by immersing the cooled, sintered body in water to produce a porous sintered body having a large open pore volume.

21. A process for the manufacture of a porous sintered body having a large open-pore volume, said process comprising the steps of:
   I. mixing a powder of a sinterable material with a powder of a leachable substance to produce a mixture, the volumetric ratio of said sinterable material to said leachable substance being from 10:1 to 1:10;
   wherein the sinterable material comprises particles having a diameter of 1–50 $\mu$m; and
   wherein the leachable substance comprises particles having a diameter of 1–500 $\mu$m; and then
   II. heating the mixture to a temperature above the sintering temperature of the sinterable material and below the melting point of the leachable substance, to form a hot sintered body; and then
   III. cooling the hot, sintered body to form a cooled sintered body; and then
   IV. leaching the leachable substance from the cooled sintered body to produce a porous sintered body having a large open pore volume.

22. A process for the manufacture of a porous sintered body having a large open pore volume, said process comprising the steps of:
  I. mixing a powder of a sinterable material with a powder of a leachable substance to produce a mixture, the volumetric ratio of said sinterable material to said leachable substance being from 10:1 to 1:10;
  wherein the sinterable material is at least one member selected from the group consisting of glass, glass ceramics, and ceramics; and
  wherein the sinterable material comprises particles having a diameter of 1–50 um; and
  wherein the leachable substance is at least one member selected from the group consisting of alkali chlorides, alkali sulfates, alkaki carbonates, alkaline earth chlorides, alkaline earth sulfates and alkaline earth carbonates; and
  wherein the leachable substance comprises particles having a diameter of 1–500 $\mu m$; and then
  II. heating the mixture to a temperature above the sintering temperature of the sinterable material and below the melting point of the leachable substance, to form a hot sintered body; and then
  III. cooling the hot sintered body to form a cooled sintered body; and then
  IV. leaching the leachable substance from the cooled sintered body to produce a porous sintered body having a large open pore volume.

23. A process for the manufacture of a porous sintered 500 having a large open pore volume, said process comprising the steps of:
  I. mixing glass particles with salt particles in a volumetric ratio of 3:7 to 7:3;
  wherein the glass particles are particles of at least one member selected from the group consisting of high alkali containing glass, sodium-lime-silicate glass, borosilicate glass, high boric acid glass, high alumina containing glass and high lead containing glass; and
  wherein the salt particles are particles of at least one member selected from the group consisting of alkali chlorides, alkali sulfates, alkali carbonates, alkaline earth chlorides, alkaline earth sulfates and alkaline earth carbonates; and
  wherein the glass particles have a diameter of 1 to 20 $\mu m$; and
  wherein the salt particles have a diameter of 1 to 500 $\mu m$; and then
  II. heating the mixture to a temperature above the sintering temperatures of the glass particles and below the melting point of the salt particles, to form a hot sintered body; and then
  III. cooling the hot sintered body to form a cooled sintered body; and then
  IV. leaching the salt from the cooled sintered body to produce a porous sintered body having a large open pore volume.

* * * * *

UNITED STATES PATENT OFFICE
CERTIFICATE OF CORRECTION

Patent No. 4,588,540        Dated May 13, 1986

Inventor(s) Werner Kiefer and Maria Sura

It is certified that error appears in the above-identified patent and that said Letters Patent are hereby corrected as shown below:

Column 14, Line 2, delete "500" and insert --body--.

Signed and Sealed this

Twenty-sixth Day of August 1986

[SEAL]

Attest:

DONALD J. QUIGG

Attesting Officer

Commissioner of Patents and Trademarks